July 16, 1946.  D. R. TRINKLE  2,404,149
CONTOURING MACHINE
Original Filed Aug. 20, 1941   2 Sheets-Sheet 1

INVENTOR
Dallas R. Trinkle
BY
Edward T. Noé
ATTORNEYS

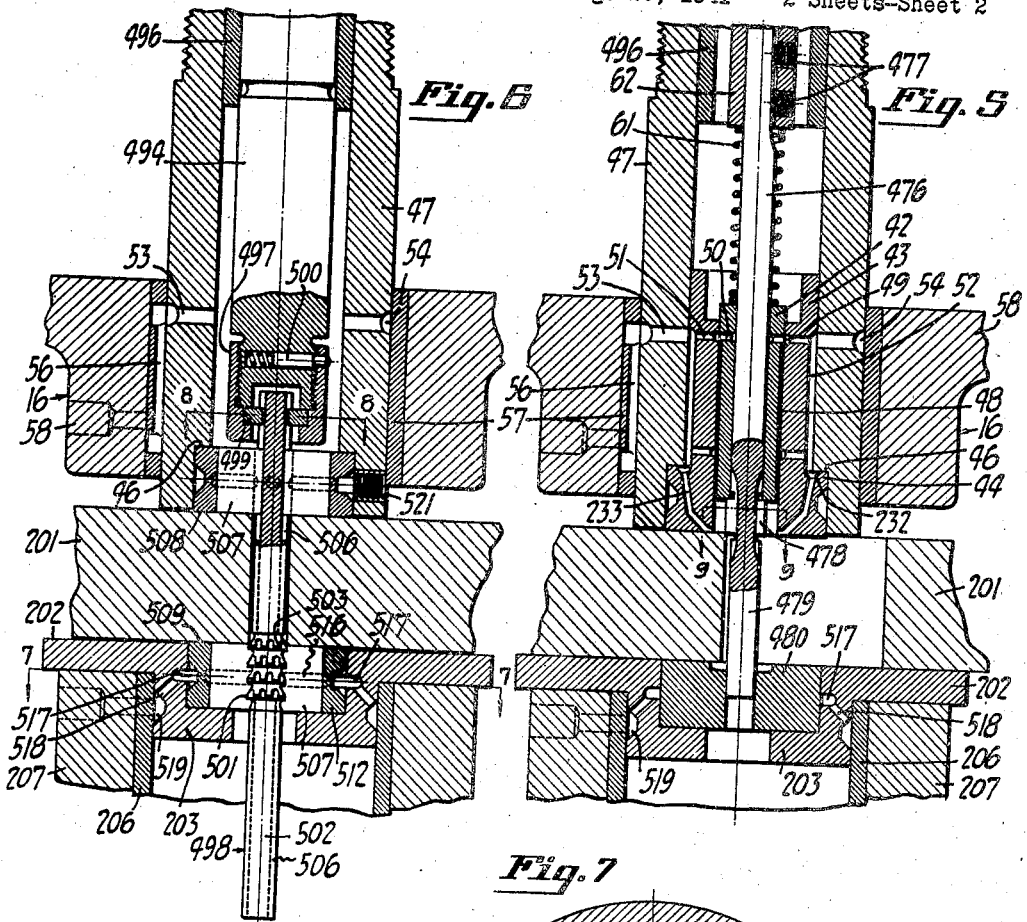
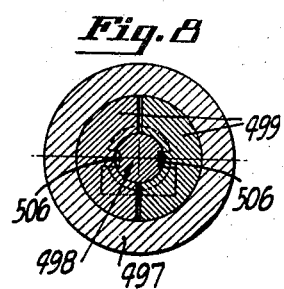
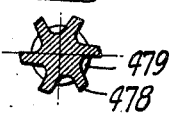
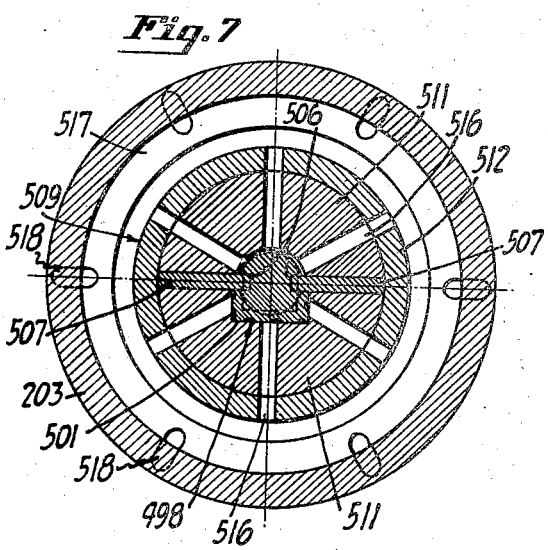

Patented July 16, 1946

2,404,149

UNITED STATES PATENT OFFICE 2,404,149

CONTOURING MACHINE

Dallas Rhea Trinkle, Dayton, Ohio, assignor to Merco-Trinkle Machine Co., San Francisco, Calif., a corporation of California Original application August 20, 1941, Serial No. 407,670, now Patent No. 2,365,365, dated December 19, 1944. Divided and this application February 1, 1943, Serial No. 474,265

12 Claims. (Cl. 90—14)

This invention relates to the art of metal working and more particularly to means for effecting contouring or die sinking, or other operations to provide a given outline or shape, the present application being a division of my co-pending application, Serial No. 407,670, filed August 20, 1941, now Patent No. 2,365,365, granted December 19, 1944, which in turn was a continuation in part of my prior application, Serial No. 291,872, filed August 25, 1939, and now Patent No. 2,283,240, granted May 19, 1942.

One object of the invention resides in the provision of a tool which is particularly adapted to carry out contouring or die sinking operations of the character referred to in my prior patent above mentioned.

Another object is the provision of a tool adapted to provide a rapid intermittent cutting operation, with the work and tool relatively located by means of a guide bushing affording a guide or support for the tool at a point very close to the work, whereby a tool such as an end mill is adapted to provide an effective cutting action.

Another object is the provision of a reciprocable rotatable tool having a shank arranged in a guide bushing and having an enlarged cutting portion at the end of the shank, in combination with means for yieldingly urging the bushing in the direction of the enlarged cutting portion.

Another object of the invention is the provision of optimum working conditions of the cutter by continuously flushing away the chips and lubricating the cutter to keep the cutting edges clean and keep the cutter cool.

Other objects and advantages of the invention will be apparent from the following description, the accompanying drawings, and the appended claims.

In the drawings,

Fig. 5 is a sectional view generally similar to Fig. 1, showing the construction and mounting of a piloted end mill;

Fig. 6 is a figure of view similar to Fig. 5, showing the construction and mounting of a piloted broach;

Fig. 7 is a horizontal section on the line 7—7 of Fig. 6;

Fig. 8 is a horizontal section on the line 8—8 of Fig. 6;

Fig. 9 is a section on the line 9—9 of Fig. 5; and,

Figure 1:
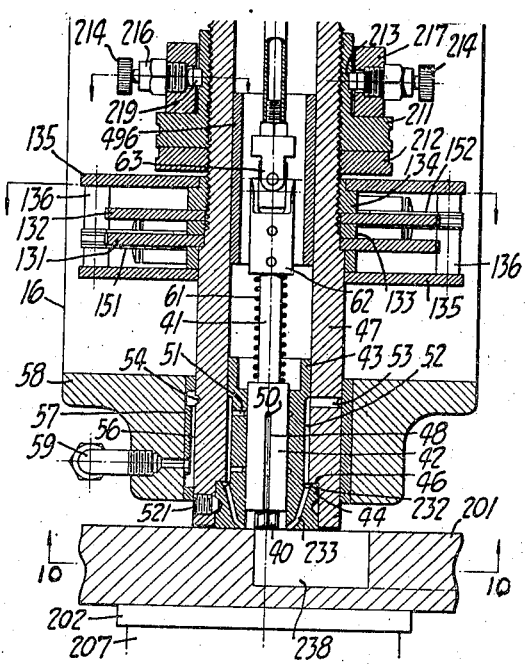
Fig. 1 is a vertical transverse section through the upper part of a cutting machine having cutting means embodying the present invention.

Referring more particularly to the drawings, a portion of a metal cutting machine is shown, provided with a cutting tool embodying the present invention. The machine may be of the character as more particularly described in my prior Patent No. 2,283,240. The numeral 16 designates a portion of the frame of such a machine, this frame being adapted to support a work carrying table which can be moved in a horizontal plane, preferably under the control of a record operated device. However, it will be obvious that the work can be moved in any other suitable manner. As the work is moved, it is supported from below by means of the plate 202, reference numeral 201 being applied to the work itself.

The tool assembly as shown in Fig. 1 is an end mill, the tool being given both a vertical reciprocatory movement and a rotary movement as will be described later. The work is adjusted or moved in time with the reciprocatory movement of the tool so that the work is stationary during the actual cutting portions of the successive cycles of operation.

Figure 2:
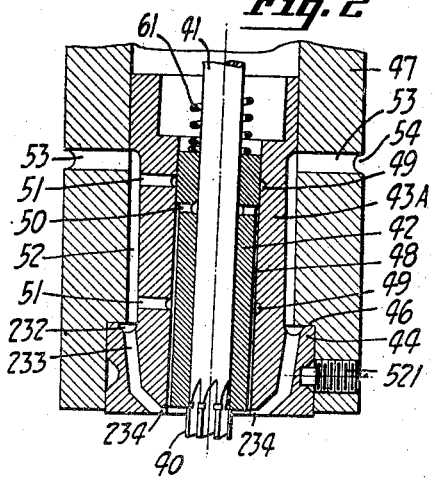
Fig. 2 is an enlarged view of a portion of the machine shown in Fig. 1.
Figure 10:
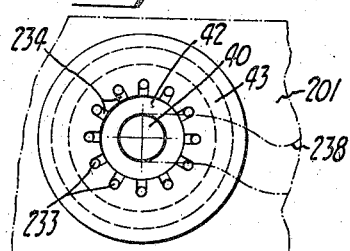
Fig. 10 is a section on the line 10—10 of Fig. 1.

The end milling tool, see Figs. 1 and 2, is mounted for both rotation and for reciprocation. End mill 40 is provided with shank 41 of reduced diameter which has a ground and lapped fit within a bushing 42 whose lower end abuts the fluted portion 40 of the tool. The ground and lapped fit provides a clearance in the order of one hundred thousandths of an inch between the end mill shank and the bushing 42. In this way the tool is accurately centered in the bushing and substantially no side play is present. Bushing 42 is also provided with a ground and lapped fit within an outer guide collar 43 having an enlarged lower end 44 with a precision lapped fit in a seat 46 of a clamping sleeve 47. The upper end of collar 43 also is provided with a precision lapped fit within the sleeve 47.

Lubricating means are provided for insuring an adequate supply of lubricant to the bearing surfaces of the tool and its mounting means. Between bushing 42 and collar 43 an oil passage is provided at either side by means of vertical grooves 48 in bushing 42, communicating with annular grooves 49 in collar 43. From upper groove 49 a plurality of radial passages 50 lead from the upper ends of vertical passages 48 to an annular groove in bushing 42 about shank 41 to supply oil to the bearing surfaces thereof. The annular grooves 49 are fed through a plurality of openings 51 from an annular oil space 52 provided between collar 43 and clamping sleeve 47. Space 52 in turn is fed through radial passages 53 from annular groove 54 on the outer surface of clamping sleeve 47, which communicates with vertical passage 56 in bearing sleeve 57 press fitted in arm 58 of frame 16. The oil is supplied through lead pipe 59 in a manner later described, so that the bearing surfaces between bushing 42, collar 43, sleeve 47 and shank 41 are all continuously supplied with lubricant.

The normal position of end mill 40 with respect to bushing 42 is shown in Figs. 1 and 2 where the bushing 42 is against the shoulder provided at the upper end of the fluted portion where it is maintained by spring 61 compressed between bushing 42 and the hub 62 forming part of a universal joint 63. The upper side of universal joint 63 is connected to a tubular rod which is connected at its upper end by universal joint with a suitable drive shaft which serves to rotate the end mill through the drive connections described and usually the rate of rotation is in the order of 1500 to 2500 revolutions per minute.

The entire tool assembly is spring urged downwardly and its vertical movement is controlled through power driven cam means and a counteracting spring means one of which controls the up movement and the other the down movement of the tool. The tool drive need not be further explained here as it is more completely described in my prior patent above referred to.

The sleeve 47, see Fig. 1, is provided with a pair of vertically spaced apart oppositely disposed ratchet wheels 131 and 132 which are separated by a collar 133 and secured by a clamping collar 134. These ratchet wheels are operated to provide a rotational control of the sleeve 47. Above the ratchet wheels, the sleeve 47 is provided with collars which provide the work clamping means operating to positively hold the work against movement during the cutting stroke of the tool and its withdrawal and to release the work while the tool is out of engagement therewith to permit the step-by-step movement of the work.

It will be noted that the work 201 is positioned between the work clamping sleeve 47 and flange 202 of the work supporting collar 203. Collar 203 has a lapped precision fit within bushing 206 which is pressed in boss 207 of arm 208 of the frame 16. The arrangement is such that the work is clamped between guide collar 43 in clamping sleeve 47 and work supporting collar 203 and the part of the work being cut by the tool is always supported by the collar flange 202, rather than by the work table, which merely serves to locate the work. In order to provide for the actual clamping of the work by guide collar 43, its lower end surface projects slightly beyond the end surface of sleeve 47.

The work clamping means operates in a timed relation to the reciprocating drive for the tool, and to provide for its clamping movement the sleeve 47 carries a threaded collar 211 adjustably mounted thereon and held in place by lock nut 212. Suitable levers 217 through their engagement with the upper flanged face of collar 211, exert a downward thrust on sleeve 47 so that guide collar 43 is pressed against the work. During normal operations, collar 43 floats on the work when not clamped thereon to prevent chips entering between the surfaces of collar 43 and the work.

Means are provided for circulating oil under pressure to the work to flush away and dispose of the chips which would otherwise interfere with the cutting operation, and to keep the cutter cool. Oil under pressure is forced from pipe 59 through space 56 and passage 53 into oil space 52. At the lower end of space 52 an annular groove 232 in shoulder 44 is provided from which a plurality of downwardly converging passages 233 lead to the lower surface of collar 43, with their lower ends converging sharply to direct the oil against the cutter. Certain of the passages 233 are always open to spray directly against the tool. In addition radial grooves 234 at the lower end of each passage 233 provide for feeding of oil to the tool even when the direct spray is prevented by the work, and the tool is withdrawn immediately above the work. Thus the cutting edges of the tool are always cleaned of chips and a low cutting temperature is maintained.

Figure 3:
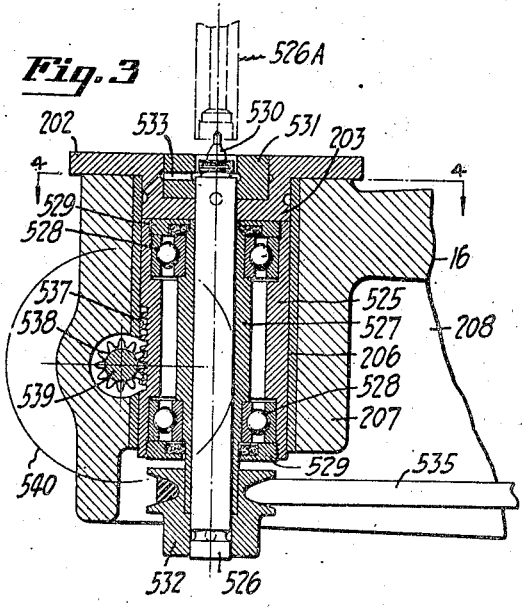
Fig. 3 is a fragmentary section view illustrating the mounting of the bottom portion of a tool for the machine.
Figure 4:
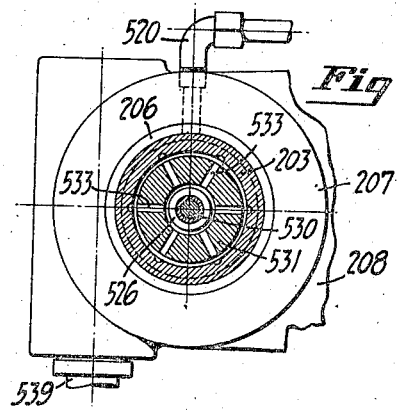
Fig. 4 is a horizontal sectional view on the line 4—4 of Fig. 3.

Referring to Fig. 5, a piloted end mill construction is shown in which the end mill is positively guided and supported both above and below the work. The tool includes shank 476 which is secured by set screws 477 in hub 62 of a universal joint similar to the construction shown in Fig. 1. The shank 476 is guided in the sleeve 42 in the same manner as in the previously described end mill and is provided with a fluted portion 478 and a lower pilot 479. The fluted portion 478 is shown in a position raised above the work, in which position the lower pilot 479 is still slidably engaged with a die 480 with which it has a ground and lapped fit. The die 480 has a ground and lapped fit within the collar 203 which is similar to that shown and described in connection with Fig. 3. As shown, the fluted portion 478 is provided between machined annular grooves, and provides end cutting edges at its lower end and a shouldered stop for spring urged bushing 42 at its upper end.

Because both the shank and the pilot have ground and lapped fits with their respective guides, namely bushing 42 and die 480, the end mill fluted portion 478 is rigidly supported against side-wise thrust and can be employed for cutting greater depths without side deflection.

If desired, the machine may be equipped with a broach of special construction, in which event the depth adjustment control becomes a control for rotative positioning of the broach.

At its upper end broach 498, Figs. 6 and 8, has an annular groove engaged by a split collar 499 held in closely spaced relationship between nut 497 and the end of ram 494. The operating position of nut 497 is maintained by spring urged locking pin 500.

Referring to Figs. 6 to 8, the broach 498 comprises a shank having cutting section 501 and lower pilot portion 502 of the shank. It will be noted that the successively acting lips of the cutting section 501 are made up of a plurality of cutting teeth 503 which are staggered from one cutting lip to the next to reduce contact with the work and also to provide oil passages as will presently be described.

To provide for mounting of the broach for endwise sliding movement but to prevent rotation other than the record-controlled positioning thereof, the broach is provided with opposite longitudinal key-ways 506 which are slidably engaged by opposite keys 507 of respective upper and lower die assemblies 508, 509 which are identical in construction. Keys 507 have lapped fits in the keyways. Each die assembly includes split die segments 511 between which the keys 507 are held and about which clamping ring 512 engages. The die assembly is constructed as follows: the keys 507 are placed in position between the die segments 511 inside the ring 512, which is shrunk onto the inner assembly and thereafter ground with respect to the center of the keys to provide an accurate lapped fit within the sleeve 47 and the collar 203, respectively.

The cutting portion 501 has a close clearance with respect to the associated die segments, while the opposite rounded portion has substantial clearance providing an oil passage entirely around the broach while it is within the die. To supply oil to the lower die assembly to flush and clear the broach, the die segments 511 and ring 512 are provided with aligned radial passages 516, which communicate with annular passage 517, having a series of passages 518 communicating therewith from an annular passage 519 in collar 203 which is supplied with lubricant under pressure from the pipe 520.

The upper die assembly is provided with oil through the same channels as the end mill and the oil is continuously forced out through the die assembly around the broach by the pump pressure, and additional pressure is provided by the ram 494 upon its downward movement when the broach starts cutting.

To provide for rotative adjustment of the broach, upper die assembly 508 is connected by dowel pin 521 to sleeve 47, and other clamping screws may also be provided to engage the top groove wall of the die, see Fig. 1. Thus the broach can be rotatively adjusted, the lower die assembly rotating freely in collar 203 simultaneously with the rotative adjustment of the broach and the upper die assembly. Lower die assembly 509 projects slightly above the collar 203 to secure the clamping thrust from sleeve 47 through the upper die assembly 508.

If desired, the machine may be equipped with a center drill for locating the centers of the holes in the lower surface of work. For this purpose the sleeve 525 below the collar 203 is mounted for endwise movement, and carries a rotatable sleeve 527 which is journaled therein by spaced bearings 528. Bearings 528 may be pre-loaded by means of screw retainers 529 which may be locked in adjusted position in the same manner as retaining nut 497. Shaft 526 extends through sleeve 527 in which a suitable center drill 530 may be removably mounted. A special screw-connected extension 526A may be employed for installing and removing drill shaft 526. Shaft 526 has a ground and lapped fit within collar 203 and projects upwardly into a die 531 having radial passages 533 for supplying oil to the drill.

To provide for vertical adjustment of the center drill the sleeve 525 may be provided with a rack 537 engaged by pinion 538 carried by a shaft 539. Shaft 539 is journalled in boss 207 and has a suitable hand wheel for manual raising and lowering of the drill.

In order to provide for an adjustable angular clearance in cutting, blanking and punching dies or to provide draft for other dies, patterns, or molds, a special guide collar 43A is provided having its outer surface and ends identical with the standard collar 43 but having the axis of its central bore extending from a position concentric with the lower end to an eccentric position at the upper end, (see Fig. 2). The resulting angular positioning or misalignment of the tool shank is accommodated by the universal joints in its drive as described in my prior patent.

In the end milling and broaching operations the work is clamped rigidly between guide collar 43 and collar 203 while the cut is being made and the tool is being withdrawn and is thereafter free for accurate feeding movement prior to the next cutting stroke. Because the end mill is spring driven in its downward cutting movement, the tool will not be broken if presented to a greater thickness of metal than it can cut. The cutting of the work takes place at a point very closely adjacent to the bearing support or guide bushing to prevent any lateral deflection of the tool. In actual practice precision finishes have been obtained with, for example, a ¼" cutter working through 1" steel that compare favorably with precision ground surfaces.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a machine of the class described, a reciprocable tool having a shank and an enlarged cutting portion providing a shoulder below said shank, tool mounting means including a support having an axially movable guide bushing engaging said shank above said cutting portion for relative endwise movement of the shank in the bushing, and means urging said bushing against said shoulder, whereby said tool is supported adjacent said cutting portion.

2. In combination, a reciprocable tool having a shank and an enlarged cutting portion, a guide bushing engaging said shank and providing for rotation and relative endwise movement of the tool, a support for said guide bushing, and means for yieldingly urging said bushing in said support in the direction of the enlarged portion of the tool.

3. In combination, a rotatable end mill having a shank and a milling end forming a shoulder thereon, a guide bushing in sliding and rotatable engagement with said shank and adapted to abut against said shoulder, and work clamping means slidably and rotatably guiding said bushing.

4. In a machine of the class described: a frame having work supporting means thereon and an apertured portion spaced therefrom, a sleeve mounted for endwise sliding movement in said apertured portion, a collar secured in said sleeve; a bushing mounted for endwise and rotative movement in said collar, a reciprocable tool having a shank slidably and rotatably engaged with said bushing and an enlarged cutting portion providing a shoulder for engagement by said bushing, and means yieldably urging said bushing to follow said cutting portion.

5. In a machine of the class described: a frame having work supporting means thereon and an apertured portion spaced therefrom, a sleeve mounted for endwise sliding movement in said apertured portion, a collar secured in said sleeve; a bushing mounted for endwise and rotative movement in said collar, and a reciprocable tool having a shank slidably and rotatably engaged with said bushing and an enlarged cutting portion providing a shoulder for engagement by said bushing, said sleeve and said collar having oil conducting passages therein with the outlets in said collar directing the oil toward said cutting portion.

6. In a machine of the class described, a reciprocable tool having a shank and an enlarged cutting portion providing a shoulder below said shank, a work engaging clamping member, a guide bushing slidably engaging said shank for relative endwise movement and slidably supported in said clamping member and mounting said tool for reciprocation, means yieldingly urging said bushing against said shoulder and a series of oil passages in said mounting means having their outlet ends in radial array about said tool to direct streams of oil against said tool during the cutting operation thereof.

7. In combination, a reciprocable rotatable tool, means mounting said tool for reciprocation and including a work clamping collar, a frame portion in which said collar is guided for axial movement, said frame portion having a fluid supply passage, an annular chamber in said collar in communication with the fluid supply passage of the frame portion throughout a range of relative movement of the collar and a series of oil passages in said mounting means extending from said chamber and having their outlet ends inwardly directed and in radial arrangement about said tool to direct streams of oil against said tool during the cutting operation.

8. In a machine of the class described, a reciprocable tool, means mounting said tool for reciprocation including a work clamping collar, and a series of oil passages in said mounting means having their outlet ends radially disposed in said collar and directed towards said tool, said outlet ends including radial recesses in the work engaging face of said collar extending to the central bore of said collar.

9. In a machine tool, a reciprocable tool having a shank and an enlarged cutting portion providing a shoulder below said shank, tool mounting means including a guide bushing slidably engaging said shank for relative endwise movement, means urging said bushing against said shoulder and a work engaging clamping member in which said guide bushing is slidably carried for endwise movement.

10. In combination, a reciprocable tool having a shank and an enlarged cutting portion, a guide bushing engaging said shank and providing for rotation and relative endwise movement of the tool, said guide bushing having a diameter substantially larger than the diameter of the cutting portions of the tool, means for yieldingly urging said bushing towards the enlarged portion of the tool, and a support in which said guide bushing is mounted for endwise movement.

11. In a metal cutting machine, a rotatable milling tool for cutting by repeated reciprocatory movements, said tool having end shank portions and a cutting portion intermediate said shank portions, means operably connected to one of said shank portions for reciprocating the tool, guide means continuously engaging one of said shank portions and providing for relative axial and rotational movements of the shank portion therein, and guide means for continuously guiding the other of said shank portions and providing for relative axial and rotational movements of the said other shank portion therein and cooperating with the first named guide means to determine the axis of the tool.

12. In a metal cutting machine, an axially reciprocable and rotatable milling tool having a cutting portion and having upper and lower shank portions extending from said cutting portion, spaced apart aligned guide means both engaging said tool throughout an axial stroke and cooperating with both said shank portions to mount the tool axis in a predetermined location, and means supporting one of said guide means for relative endwise movement.

DALLAS RHEA TRINKLE.